Figure 1:
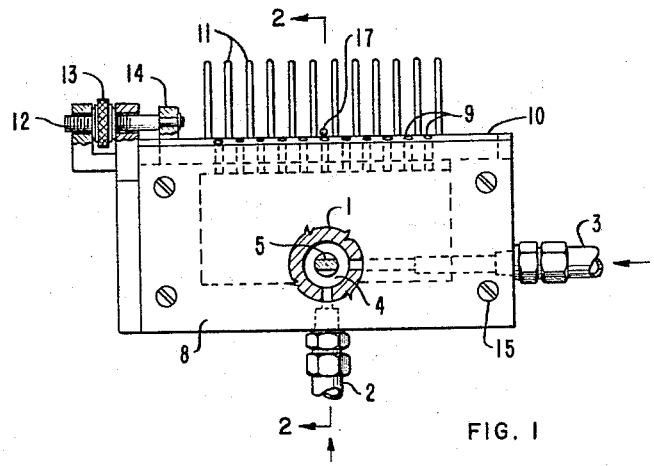

June 6, 1967 J. C. VAN DIJK 3,323,941
PROCESS AND APPARATUS FOR IMPREGNATING STRANDS OF FILAMENTS
Filed July 12, 1963

INVENTOR:
JAN CORNELIS VAN DIJK

BY: *James H. Parker*
HIS ATTORNEY

3,323,941
PROCESS AND APPARATUS FOR IMPREGNATING STRANDS OF FILAMENTS
Jan Cornelis Van Dijk, Delft, Netherlands, assignor to Shell Oil Company, New York, N.Y., a corporation of Delaware
Filed July 12, 1963, Ser. No. 294,557
Claims priority, application Great Britain, July 17, 1962, 27,468/62
5 Claims. (Cl. 117—115)

This invention relates to a method and apparatus for impregnating strands of filaments. More particularly, the invention provides a process and apparatus for impregnating strands of glass filaments with a quick-setting synthetic resinous compound.

It has been customary to impregnate strands of glass filaments with a resin by immersion of the strands in a bath containing the resin in a liquid monomeric form or as a partially polymerized solution. In such a bath the resin flows between the individual filaments of each strand, while the resin also adheres to the surface of the strand. This method therefore has several disadvantages. First, the particular strands are coated, i.e., the full surface is covered, rather than impregnated, with the attendant use of unnecessary excess resin. Second, relatively large amounts of resin and curing or hardening agents are required for use in such bath processes, thus limiting the process to slower hardening resin systems or to the undesirable batch or semi-batch preparation of the catalyst-resin mixture. In other words, in such batch systems, great care is required to prevent the "setting-up" of the liquid resin in the bath.

It is therefore the primary object of the present invention to provide a method and apparatus for impregnating strands of filaments in a more efficient and economical way. Another object of the present invention is to provide a method and apparatus for impregnating strands of filaments with a quick-hardening or quick-setting resinous compound. A further object of the present invention is to provide a continuous method and apparatus for impregnating strands of filaments. Still other objects will become apparent to those skilled in the art from the following disclosure and accompanying drawing.

The method according to the invention comprises drawing each strand over an orifice while injecting impregnation fluid through the orifice onto the strand. Only a small portion of the surface of the strand comes into contact with the orifice and hence with the impregnation fluid. Therefore this method makes it possible to impregnate the strand without covering the full surface thereof with impregnation fluid by injecting the impregnation fluid at a rate which is lower than would be required both to impregnate and to coat the strands. Hence the method is particularly suitable for all those applications were impregnation is the sole or main objective and coating of the strands would serve no useful purpose or for other reasons would be unwanted. A further advantage of the method is that any desired degree of impregnation of the strand can easily be obtained by adjusting the rate of injection of the impregnation fluid with respect to the speed of the strand being drawn over the orifice.

The method is particularly suitable for use with a quick-hardening substance, as, for example, a composition of a synthetic resin and a curing agent. It is obvious that the present method can be carried out with only a minute quantity of such quick-hardening composition present in the impregnation apparatus at any moment during the impregnation operation since this particular quantity is injected into the strand very soon after its formation. The time that elapses between the formation of the quick-hardening composition and the injection thereof into the strand can therefore be kept well under the hardening time, so that the danger of development of deposits inside the apparatus, such as would occur in the bath with the conventional method, is excluded.

Whereas in the conventional method the strands move in a substantially horizontal direction through the bath, it is a particular advantage of the method of this invention that the strands during impregnation can move in any convenient direction, including a vertical direction.

The apparatus according to the invention comprises an impregnation chamber provided with at least one orifice in its wall for discharge of impregnation fluid from the chamber into the strand lying against the outlet side of the orifice, the part of the wall near the orifice being curved so that each strand when drawn over the orifice in contact with said part of the wall is pressed against the orifice. The apparatus may be provided with a plurality of juxtaposed orifices, and with guiding means arranged near the orifices for guiding each of a multiplicity of strands over one of said orifices. In this way many strands can be impregnated simultaneously. Preferably each orifice is formed by a flat part of a wall of the main housing of the apparatus and a wall of a recess in a separate construction element, the element being detachably connected to the housing.

In order to obtain alignment of the strands with the orifices, the position of the guiding means can be adjustable with respect to the orifices.

Figure 2:
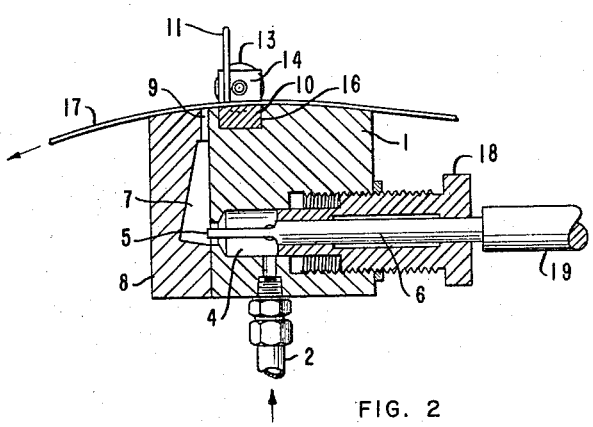
Figure 3:
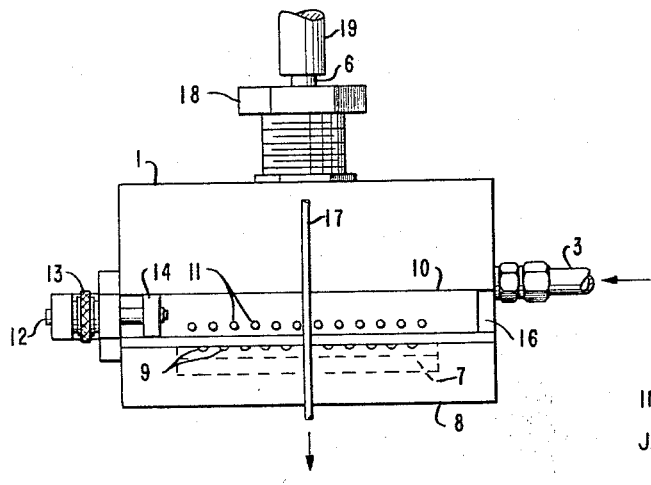

One embodiment of the invention for use with a quick-hardening resin will now be described by way of example with reference to the accompanying drawing, in which:

FIGURE 1 is a front view of the apparatus;
FIGURE 2 is a section taken on the line 2—2 of FIGURE 1; and
FIGURE 3 is a top view of the apparatus.

Referring to the drawing, a housing 1 is connected to supply lines 2 and 3 for the separate delivery of a synthetic resin in its liquid monomeric phase and a curing agent. The resin and the curing agent are delivered from individual storage tanks by metering pumps. In the housing 1 the supply lines 2 and 3 debouch into a small mixing chamber 4 in which there is an agitator 5. In the design illustrated the agitator 5 simply consists of a flattened portion of the front of a shaft 6, as may be seen from the front cutaway view of the agitator 5 shown in FIGURE 1. The agitator 5 can be rotated by a small electric motor (not shown) via the motor shaft 19 and the agitator shaft 6, which is led through a screwed bushing 18. The mixing chamber 4 is in connection with an impregnation chamber 7, which at one end is provided with orifices 9. Both the impregnation chamber 7 and the orifices 9 are formed by the walls of a recess in the front plate 8 and the opposite flat wall of the housing 1. The front plate 8 is connected to the housing 1 by bolts 15, so that the front plate 8 can be removed from the housing 1 for cleaning the interior of the apparatus. Moreover, if required, the front plate 8 can be simply exchanged for one with a different type and number of orifices.

Near the orifices 9 teeth 11 are placed for guiding the strands to be impregnated over the orifices 9. The teeth 11 are mounted on a slide 10 which is slideably placed in a correspondingly formed channel 16 in the housing 1. The position of the teeth 11 with respect to the orifices 9 can be adjusted by means of a screw 12. One end of this screw 12 is fixed to a bracket 14 which is itself connected to the slide 10. A wheel 13, screwed on the screw 12, is located between stationary parts of the apparatus, so that the wheel 13 cannot move in the axial direction.

Turning the wheel 13 around the screw 12 will move the slide 10 in the channel 16 and hence the teeth 11, so that the teeth 11 can be brought in the right position. In the vicinity of the orifices 9 the walls of the housing 1 and the front plate 8 are slightly curved downwardly.

In use, the resin and the curing agent are pumped separately at controlled rates through the supply lines 2 and 3 to the mixing chamber 4. In this chamber the resin and the agent are thoroughly mixed into a homogeneous, quick-hardening mass by the rotating agitator 5. The mixing is facilitated by the very small volume of the mixing chamber 4. The resinous compound formed in the mixing chamber 4 passes into the impregnation chamber 7, whence it is discharged through the orifices 9. The volume of the impregnation chamber 7 and the orifices 9, like that of the mixing chamber 4, is made so small that the residence time of the compound in the apparatus will be well under the hardening time. The strands 17 to be impregnated are drawn over the top of the apparatus in contact with the curved wall thereof, as shown in the drawing, and each is guided accurately over one of the orifices 9 by the teeth 11. In this way the strands under tension are pressed onto the orifices 9, so that the impregnation fluid can be injected from the orifices 9 into the strands without causing the strands to lift from the orifices 9. The width of the orifices 9 transverse to the direction of movement of the strands 17 is smaller than the width of the strands 17 when on the orifices 9. The last named width is not the same as the diameter of the unsupported part of the strands 17, since by being pressed onto the apparatus the strands 17 have a tendency to flatten, i.e., to assume a tape-like appearance. This flattened shape of the strands 17 helps to obtain a good distribution of the impregnation fluid over the cross-section of the strands, while at the same time the flattened underside acts as a seal on the orifice to prevent leakage of impregnation fluid from between the strands 17 and the orifices 9.

Preferably, the speed of the strands 17 moving over the orifices 9 and the injection rate of impregnation fluid are so adjusted with respect to each other that the surface of the strands 17 on the opposite side from the orifices 9 is not covered with the impregnation fluid. In such a case only the bottom part of the strands, that is, that part having been in contact with the orifices 9, is wetted. This is of particular advantage when the strands impregnated with the quick-hardening composition are used for the manufacture of tubes. These tubes can be formed by winding the strands on a metal mandrel in successive layers; the wetted underside of the strands is then laid on and against the uncovered surface of the strands of the preceding layer. In this way a good bond is effected between the strands of each layer with a minimum consumption of resin.

When the impregnation is to be stopped, one of the supply lines 2 and 3 is closed, whereafter the interior of the apparatus is flushed with liquid from the other supply line. In this way the apparatus is made free from hardenable matter.

The apparatus shown in the drawing can also be cleaned by screwing the threaded bushing 18 fully into the apparatus, so that any liquid in the mixing chamber 4 is discharged therefrom into the impregnation chamber 7. The latter can then be easily cleaned after detaching the front plate 8 from the main housing 1.

If the impregnation material used is not quick-hardening, the mixing chamber 4 and one of the supply lines 2 and 3 may be omitted or, if mixing is still essential, this may be done in a separate mixing apparatus.

Though the best result with this method is obtained with strands composed of long (endless) filaments, the method can also be applied to strands with shorter filaments or fibers.

The resins which are suitable for use in the present process and apparatus include, among others, polyester, polyether, polyepoxy, polyurethane, phenol-aldehyde, urea-formaldehyde, melamine-formaldehyde resins and mixtures thereof. Suitable polyester resins (alkyd) are described in "The Chemistry of Synthetic Resins," Carleton Ellis, chapters 42–49, Reinhold Publishing Co. (1935). The preparation of operable polyether and polyepoxy resins are described in "Epoxy Resins," Lee and Neville, McGraw-Hill Book Company (1957) and in United States Patent No. 2,633,458, issued Mar. 31, 1953, to Shokal. The preparation and properties of suitable phenol-aldehyde and urea-formaldehyde resins can be found in "The Chemistry of Synthetic Resins," chapters 13–22 and 26–32. Information on suitable polyurethanes can be found in "Polyurethanes, Chemistry and Technology," Saunders and Frisch, John Wiley and Sons (1962).

Curing agents which are suitable for use in the present invention are, in general, discussed in the above-noted sources in conjunction with the respective resins.

It was found that the present method and apparatus are particularly suitable for impregnating strands of glass filaments when the quick-setting impregnating fluid comprised a polyepoxide resin (Polyether A of Shokal, U.S. Patent No. 2,633,458, issued Mar. 31, 1953) and $BF_3$-etherate as curing agent. The impregnating fluid so prepared and applied using the apparatus described hereinbefore and illustrated in the accompanying drawing, set hard within a few minutes at room temperature, producing an impregnated strand of glass filaments with the minimum amount of resin. Similar efficient impregnating was achieved using the apparatus illustrated in the drawing when the curing agent was an aliphatic amine such as diethylene triamine (DTA), with and without the addition thereto of phenol. Related impregnating runs were made with other resins, including polyurethanes, phenol-formaldehyde and alkyd resins. In every instance, the impregnation was efficiently accomplished with the minimum required resin.

In many instances it is desirable to use a resin-curing agent system that effectively cures in a short time at room temperature. However, if heat is desired to facilitate the cure of the impregnating system, the impregnated strand may be passed through a suitable heated zone, such as, for example, a tubular oven.

I claim as my invention:

1. A process for impregnating multi-filament strands which comprises the steps of
   (1) preparing a quick-setting, synthetic, resinous impregnating composition by mixing a liquid resin and a curing agent in a mixing chamber,
   (2) immediately ejecting said resinous composition through an orifice onto said strand and concurrently
   (3) passing said strand over a convex-faced impregnating surface containing said orifice so that the strand spreads to a flattened, tape-like structure which is wider than the orifice through which the impregnating composition is ejected onto said strand.

2. A process for impregnating a plurality of multi-filament strands which comprises the steps of
   (1) mixing a quick-setting synthetic, resinous impregnating composition prepared by mixing a liquid resin and a curing agent in a mixing chamber,
   (2) immediately ejecting said resinous composition through a plurality of juxtaposed orifices onto a plurality of strands, and concurrently
   (3) aligning and passing each of said aligned plurality of strands over a convex-faced impregnating surface containing said orifices so that each strand spreads to a flattened tape-like structure which is wider than the orifice through which the impregnating composition is ejected onto said strand.

3. A process as in claim 2 wherein the strands are composed of long filaments of glass.

4. A process as in claim 2 wherein the impregnated strands are then passed through a heating zone.

5. An apparatus for impregnating multi-filament strands with a synthetic, resinous impregnating fluid which comprises
   (1) a housing having a mixing chamber formed therein and a convexly curved upper exterior surface,
   (2) supply lines connected to said housing and debouching into said mixing chamber for separate delivery of a liquid synthetic resin and a curing agent,
   (3) an impregnating chamber communicating with said mixing chamber and provided at its upper end with a plurality of juxtaposed orifices terminating in said convexly curved upper surface of said housing,
   (4) slideably adjustable means for aligning each of a multiplicity of multi-filament strands over each of said orifices,
   (5) means for drawing said multi-filament strands under tension over said orifices so that each strand spreads to a flattened, tape-like structure which is wider than the respective orifice.

References Cited

UNITED STATES PATENTS

| | | | |
|---|---|---|---|
| 2,464,771 | 3/1949 | Van Guelpen | 118—410 X |
| 2,909,151 | 10/1959 | Kahn | 117—115 X |
| 2,934,458 | 4/1960 | Budd et al. | 117—126 |
| 2,963,739 | 12/1960 | Whitehurst et al. | 118—420 X |
| 2,976,177 | 3/1961 | Warthen | 118—420 X |
| 3,076,324 | 2/1963 | Morgan | 65—3 |
| 3,126,608 | 3/1964 | Whitehurst. | |
| 3,155,543 | 11/1964 | Marzocchi et al. | 117—126 |

ALFRED L. LEAVITT, *Primary Examiner.*

E. B. LIPSCOMB III, *Assistant Examiner.*